United States Patent [19]
Ohlig

[11] Patent Number: 5,410,385
[45] Date of Patent: Apr. 25, 1995

[54] VACUUM REGISTRY EXPOSURE SYSTEM AND METHOD

[76] Inventor: Ernest Ohlig, 2306 Holiday Rd., Newport Beach, Calif. 92660

[21] Appl. No.: 28,345

[22] Filed: Mar. 9, 1993

[51] Int. Cl.⁶ .............................................. G03B 27/20
[52] U.S. Cl. ...................................... 355/91; 355/87; 355/94
[58] Field of Search ........................... 355/91, 94, 87

[56] References Cited

U.S. PATENT DOCUMENTS

| | | | |
|---|---|---|---|
| 3,644,040 | 2/1972 | Beispel | 355/103 |
| 4,607,953 | 8/1986 | Farris | 355/91 |
| 4,620,787 | 11/1986 | Black et al. | 355/76 |
| 4,967,230 | 10/1990 | Meacham | 355/91 |
| 5,017,960 | 5/1991 | Tuulse | 355/91 |
| 5,255,052 | 10/1993 | Ternes et al. | 355/91 |

*Primary Examiner*—Monroe H. Hayes
*Attorney, Agent, or Firm*—Albert C. Smith

[57] ABSTRACT

The apparatus and method of the present invention uses a register light unit to facilitate manual alignment of master photographic images on a flexible carrier sheet. The carrier sheet and master images are positioned relative to a photosensitive screen using a vacuum contact plate that receives a screen frame in tight registration using a substantially planar surface for supporting the flexible carrier sheet with master images thereon. Vacuum is drawn around the screen to develop a pressure differential across the carrier sheet to urge the master images thereon into surface contact with the photosensitive screen during exposure to a source of illumination. Work stations include storage bins for prepared screens and master films to expedite processing through an exposure unit that includes a vacuum contact plate which is mounted to translate between a load/unload position outside of a housing and an exposure position inside of a housing that shields an operator from radiation from the source of illumination.

8 Claims, 11 Drawing Sheets

Figure 2

(Prior Art)

VACUUM REGISTRY EXPOSURE SYSTEM AND METHOD

FIELD OF THE INVENTION

This invention relates to contact exposure systems, and more particularly to the method and apparatus for retaining photographic sheets in proper registration during exposure to a source of illumination.

BACKGROUND OF THE INVENTION

Conventional contact exposure systems commonly retain original photographic master and copy sheets in contact registration against a glass platen during exposure through the glass platen. Substantially uniform force may be exerted on the photosensitive materials to retain them in registration against the platen by providing an impervious vacuum blanket over the sheets and by evacuating air from the region between the blanket and platen. One difficulty encountered with conventional systems of this type is that residual volumes of air may not be evacuated from between the photographic sheets and result in air bubbles and creases in the sheets which then distort the reproduced image. Several schemes have been devised to ensure more complete evacuation of air from within the region between the photographic sheets and the platen, but such schemes still require glass platens of substantial thickness and weight to accommodate large photographic sheets, and still require significant intervals of vacuum pumping that slow down the throughput rate of photographic reproductions. In addition, exposure time may be long because the illumination is evenly spread over a large area that commonly includes the entire area of the platen out to borders and frames that may not be occupied by most reproductions. This results in exposure times that may be two or more times longer than would be required for exposure only of a usable area of an individual frame of photographic materials. Also, high-energy illumination sources for exposing an entire platen area, typically, as large as 8 feet by 10 feet, must be enclosed to avoid exposing an operator to ultraviolet radiation, and such sources and enclosures must then be ventilated for proper cooling.

SUMMARY OF THE INVENTION

In accordance with the present invention, an improved vacuum registration system obviates the need for a glass platen and typical long vacuum pumping cycles to significantly increase the throughput of photographic contact reproductions. The preferred embodiment of the present invention includes exposure equipment that is sized to accommodate the area of typical photographic sheets that are retained in proper registration during exposure by a combination of a quick-set registration frame and vacuum system that promote easier registration, shorter vacuum pumping intervals, shorter exposure times, and no heavy glass platen to manipulate for more rapid loading and unloading and resultant higher overall throughput.

DESCRIPTION OF THE PREFERRED EMBODIMENT

Figure 1:
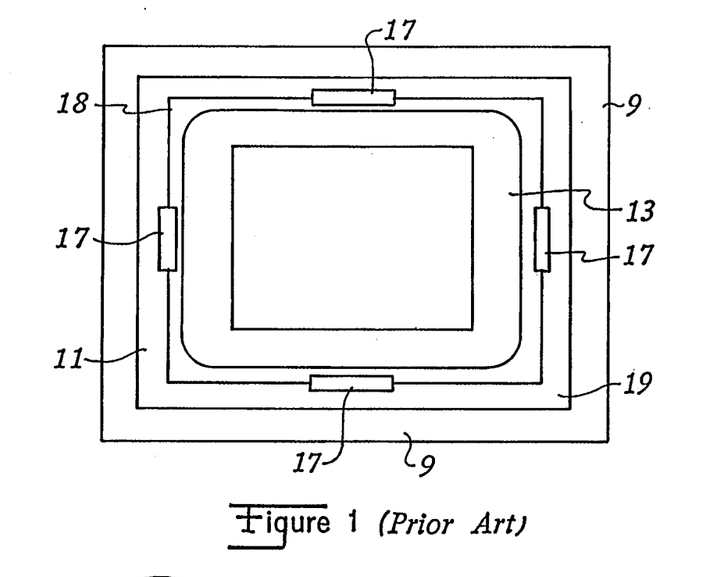
FIG. 1 is a plan view of a conventional film and screen registration scheme.
Figure 2:
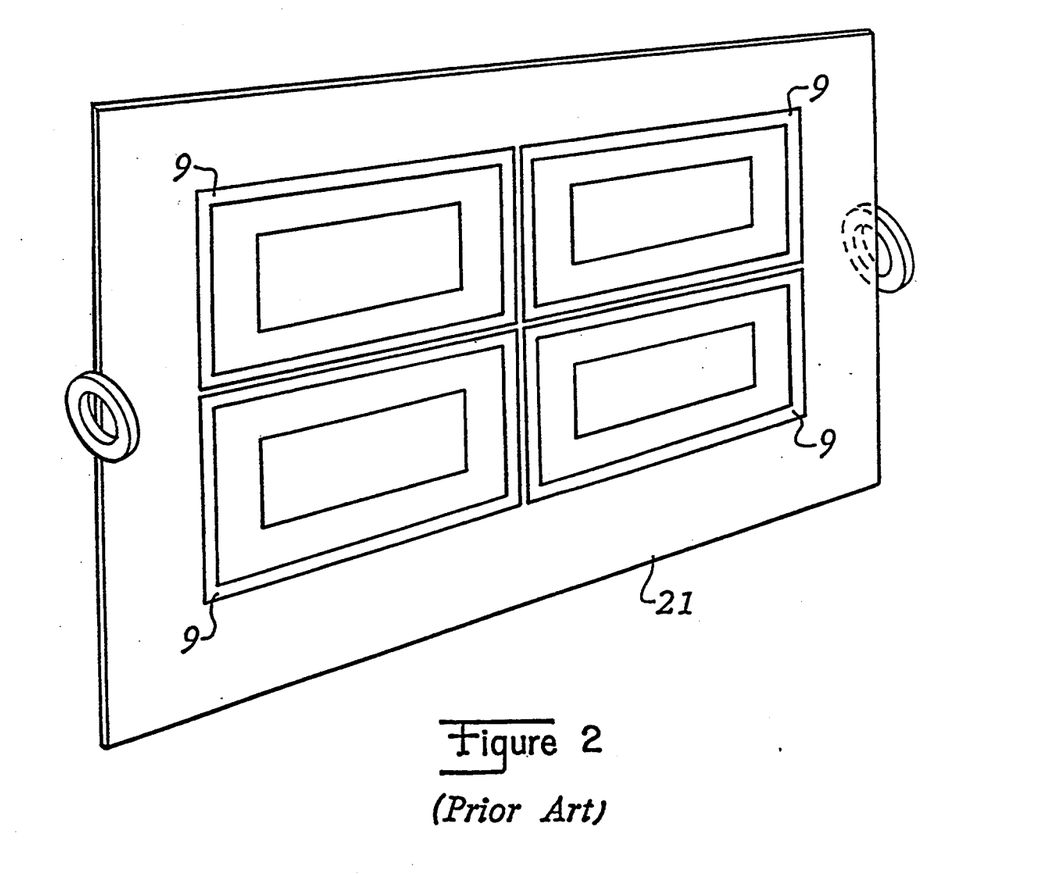
FIG. 2 is a prospective view of a conventional platen system.
Figure 3:
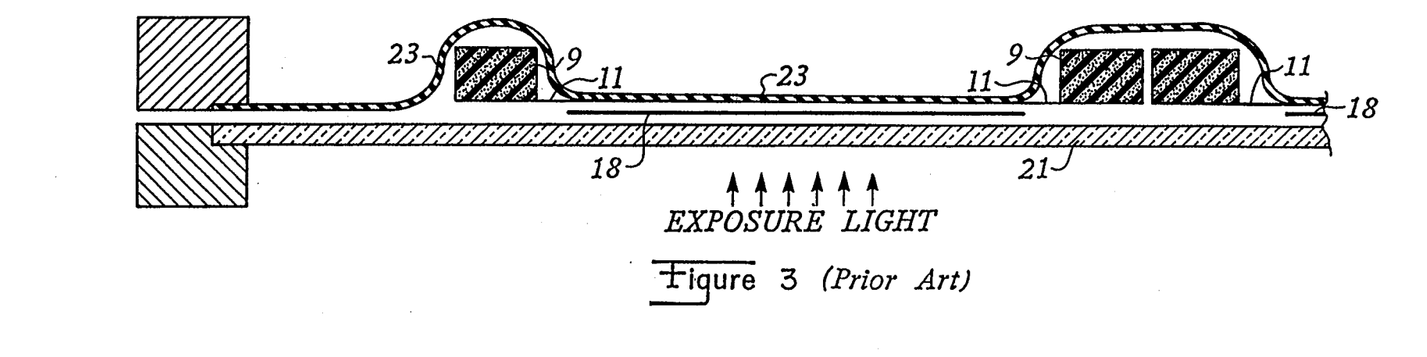
FIG. 3 is a sectional view of a conventional vacuum hold-down scheme.

Referring now to the plan view of FIG. 1, there is shown an assembly of photographic sheets prepared in conventional manner on a carrier or backing sheet for exposure to a source of illumination. Specifically, a rigid frame 9 supports a screen 11 which may be of porous, woven material (eg., silk screen) that is coated in a selected area 13 on one surface with a photographic (or other actinically-sensitive) layer of material. A master sheet 18 having larger peripheral area than the selected area of photosensitive coating is attached to the border area 19 of the screen 11, for example, using adhesive tape 17 to form a composite screen ready for exposure. As illustrated ill the perspective view of FIG. 2, there is shown a transparent platen 21 having a plurality of prepared composite screens positioned over the area of the platen in preparation for vacuum, hold down, as illustrated in the sectional view of FIG. 3. Specifically, an impervious flexible vacuum blanket 23 is conventionally positioned over the composite screens and over the platen 21 to form a seal therewith in order to support a pressure differential across the blanket 23. Residual volumes of air are then evacuated from between the blanket 23 and platen 21 in conventional manner in order to establish a force attributable to air pressure acting on the blanket 23 to urge the composite screens against the platen 21 with the original or master sheet 18 adjacent the platen 21 for exposure therethrough to a source of light.

Figure 4:
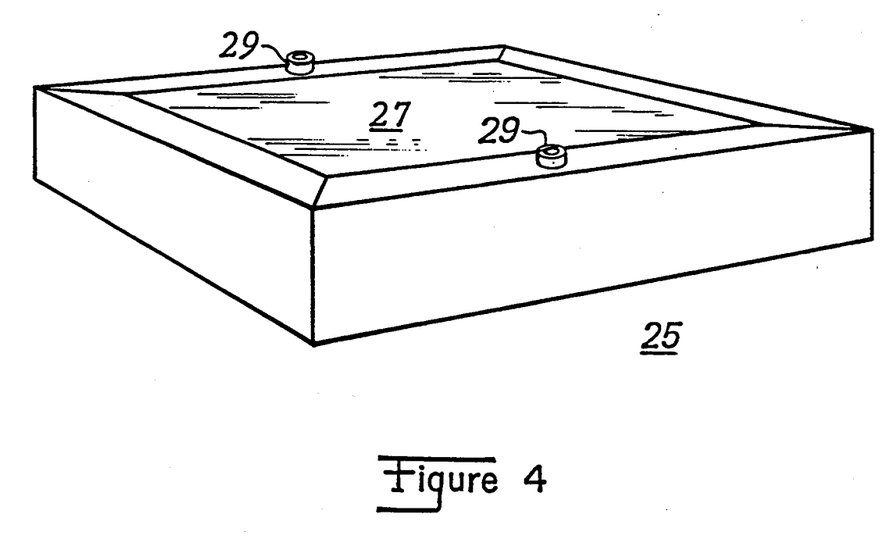
FIG. 4 is a perspective view of embodiment of the register light unit according to the present invention.
Figure 5:
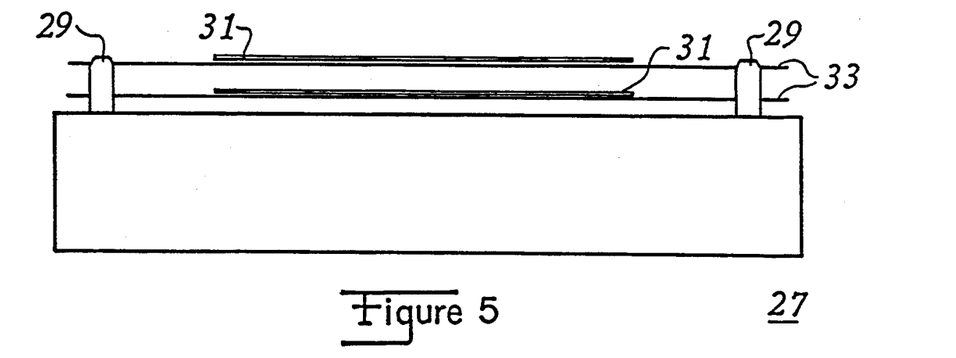
FIG. 5 is a side view of an assembled frame of photographic master sheets for contact exposure.
Figure 6:
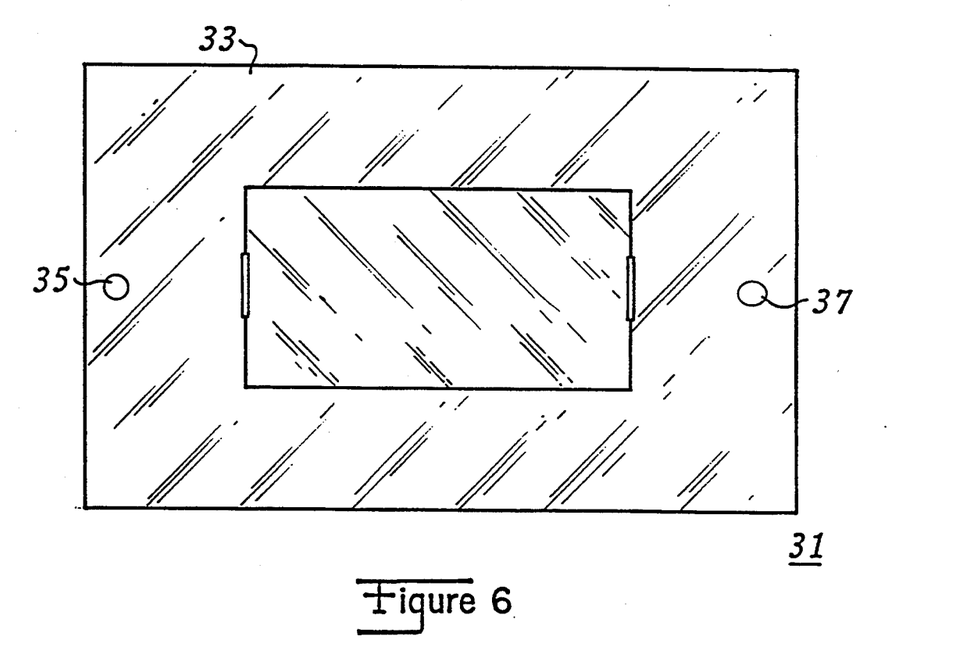
FIG. 6 is a plan view of a prepared carrier sheet according to the present invention.

In accordance with one aspect of the present invention, carrier sheets are prepared with original or master sheets separately to facilitate exposure of prepared photosensitive screens. Referring now to the perspective view of FIG. 4, there is shown a register light unit 25 that provides substantially uniform light flux through a surface platen 27 which may be translucent glass, and that includes registration pins 29 near opposite boundaries of the platen 27. As illustrated in the plan view of FIG. 6, an original or master sheet 31 may be assembled by attachment to a transparent, flexible carrier sheet 33 at a selected location while the carrier sheet (with registration hole 35 and slot 37) is positioned on the registration pins 29 supported on the register light unit 25. A typical carrier sheet 33 may be formed of a sheet material such as "mylar" that is commercially available from DuPont de Nemours Company. Additional such carrier sheets 33 with associated master sheets 31 may also be supported on the surface platen 27 and properly aligned with lower carrier sheets and master sheets 31 while positioned on the registration pins 29 in applications requiring alignment of several separate master sheets to produce one composite image. All such prepared carrier sheets 33 with associated attached master sheets 31 may be stored in selected sequence within a bin 39 of a storage-transfer rack, for example, as illustrated in the perspective view of FIG. 11, to facilitate work flow, as later described herein.

Figure 7:
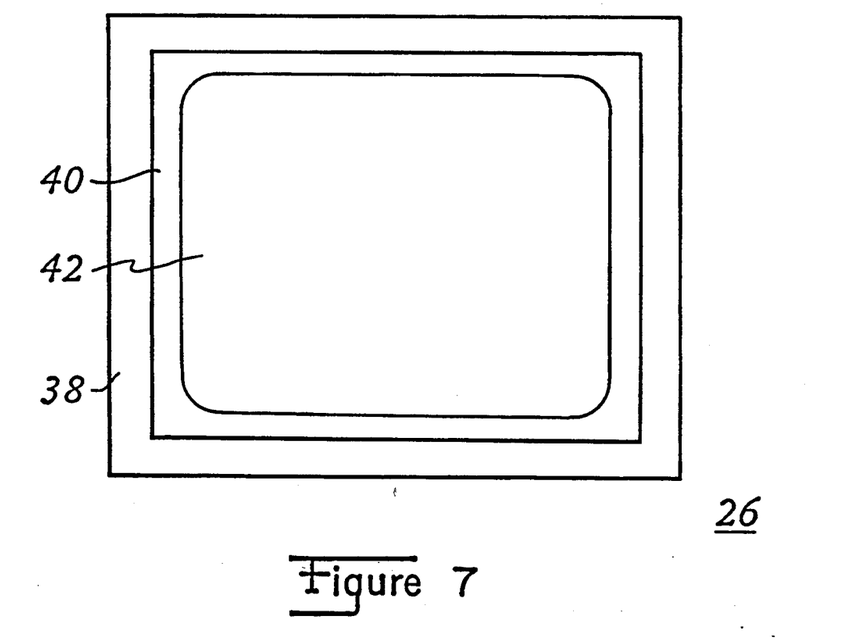
FIG. 7 is a screen frame prepared for exposure according to one embodiment of the present invention.

Referring now to the plan view of FIG. 7, there is shown a screen frame 26 according to one aspect of the present invention including a rigid outer frame 38 that supports a woven mesh or screen 40 thereon in planar relationship with one face of the frame. The screen 40 is coated 42 in a selected area (preferably on the rear side that faces out or up above the face of frame 38) within the perimeter of the frame 38 with a photosensitive material such as a conventional photographic emulsion that becomes impervious or insoluble after exposure to ultraviolet radiation. The coated area 42 is selected to leave a perimeter of clear or uncoated screen 44 all around between the coated area 42 and the perimeter of frame 38. Screen frames thus prepared may then be stored in bins 46 of a storage-transfer rack, for example, as illustrated in the perspective view of FIG. 11.

Figure 8:
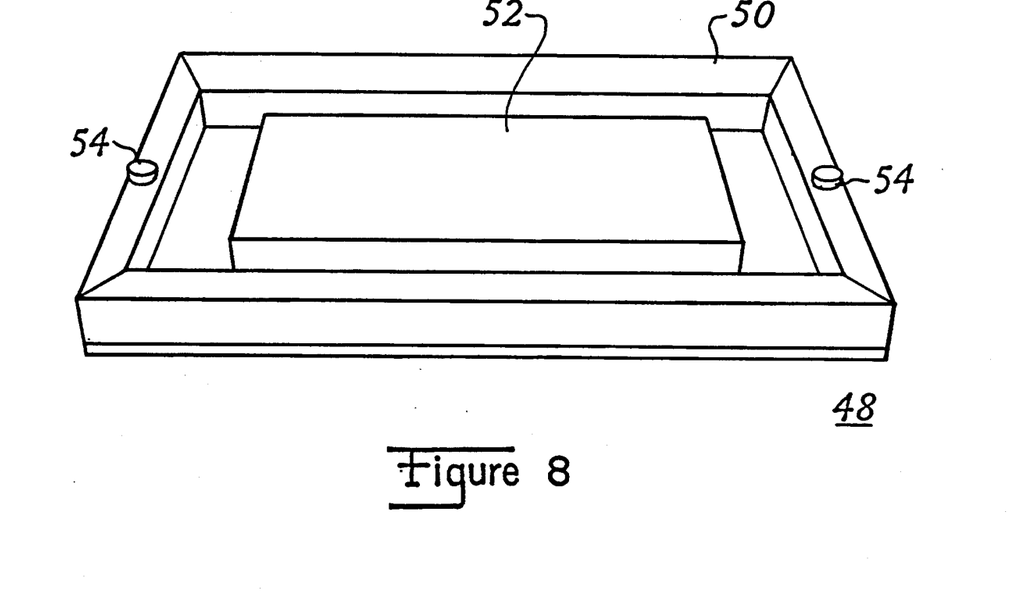
FIG. 8 is a perspective view of a vacuum contact plate for retaining a screen frame in proper registration during exposure according to the present invention.
Figure 9:
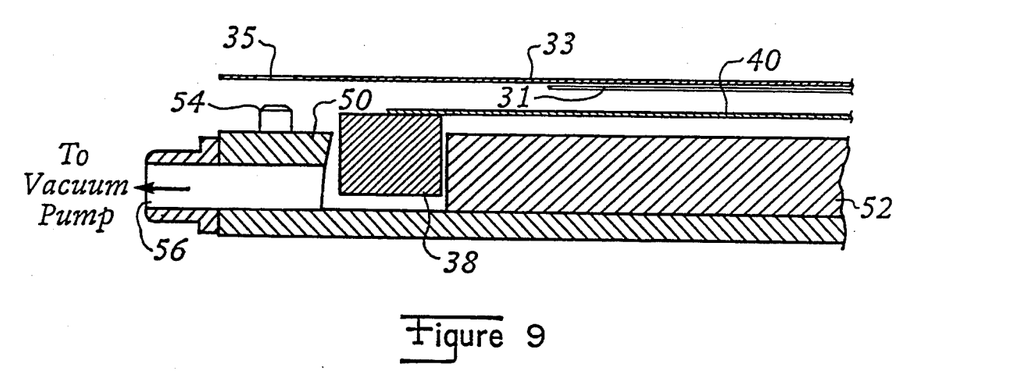
FIG. 9 is a sectional view showing the vacuum contact plate and screen frame and cover sheet in registration positions in preparation for vacuum hold-down and exposure according to the present invention.
Figure 10:
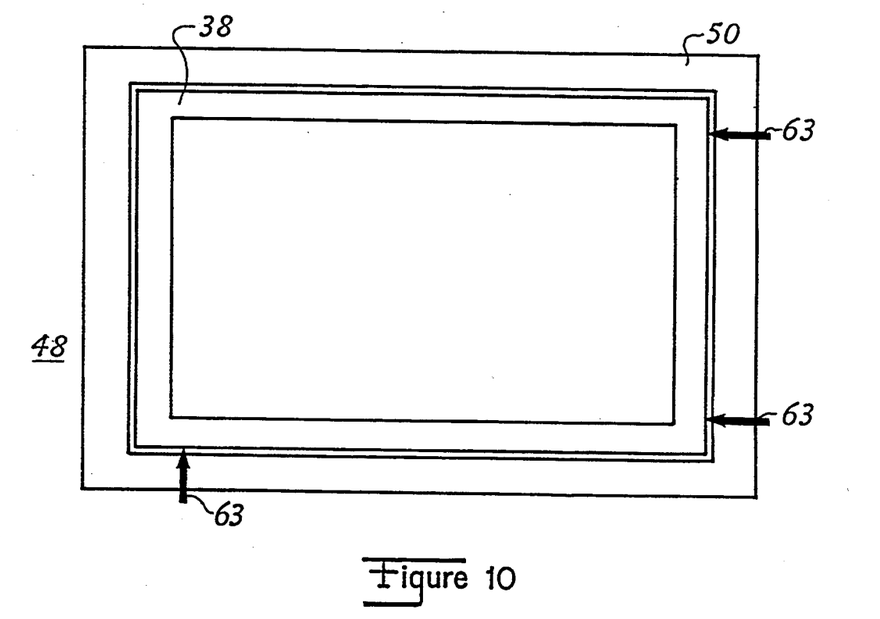
FIG. 10 is a top view of the elements of FIG. 7 and FIG. 8 assembled according to FIG. 9.

Referring now to FIG. 8, there is shown a perspective view of a vacuum contact plate 48 according to the present invention including an outer frame 50 having a centrally-oriented screen support section 52 spaced inwardly from the inner boundaries of the outer frame 50. Registration pins 54 are positioned in the outer frame 50 at the same spacing as the registration pins 29 on the register light unit illustrated in FIG. 4. The spacing between the inner boundaries of the outer frame 50 and the inner screen support 52 is adequate to receive therein the frame 38 of a prepared screen frame, as illustrated in FIG. 7. Thus, as illustrated in the side sectional view of FIG. 9, the vacuum contact plate includes a vacuum port 56 that communicates with the recessed area between the inner perimeter of the outer frame 50 and the outer perimeter of the central screen support 52. The vacuum contact plate 48 thus is capable of receiving a prepared screen frame of the type illustrated in FIG. 7 in inverted orientation with the frame 38 of the screen frame disposed within the inner boundaries of the outer frame 50 of the vacuum contact plate 48, and with the screen 40 disposed substantially planarly over the central screen support 52. The original or master film 31 on a carrier sheet 33 may then be placed on the registration pins 54 that are oriented and spaced the same as the hole 35 and slot 37 in a carrier sheet 33, with the master film 31 faced down adjacent the screen 40 and the photosensitive coating 42 thereon. The carrier sheet 33 thus substantially overlays the entire outer frame 50 of the vacuum contact plate 48 and is substantially completely supported by the outer frame 50, the frame 38 of the screen frame, and the central screen support 52 of the vacuum contact plate 48. The screen frame 38 may be registered for accurate placement against registration points 63 along the inner boundaries of the outer frame 50 of the vacuum contact plate 48, as illustrated in FIG. 10, and air may then be pumped out in conventional manner through the vacuum port 56 to produce a pressure differential across the carrier sheet 33 that overlays the outer frame 50. The resultant force attributable to the pressure differential across the carrier sheet 33 is in the direction to urge the master film 31 on the carrier sheet 33 into contact registration with the screen 40 and the photosensitive coating 42 thereon. The vacuum contact plate 48 and the screen frame thus configured, with a carrier sheet 33 and master film 31 positioned against the screen 40 is thus ready for evacuation of air prior to exposure to a source of illumination (for example, to ultraviolet light) in order to photographically compose the image of the master film 31 upon the photosensitive coating 42 on the screen 40. The granular or nodular mesh surface of the screen 40 permits residual volumes of air to be evacuated from between screen 40 and the flexible carrier sheet 33. The flat surface of the perimeter of the outer frame 50 can provide an adequate seal with the overlaying carrier sheet to promote pressure differential thereacross, and thereby establish contact pressure of the master film 31 against the photosensitive coating 42 on the screen 40.

Figure 11:
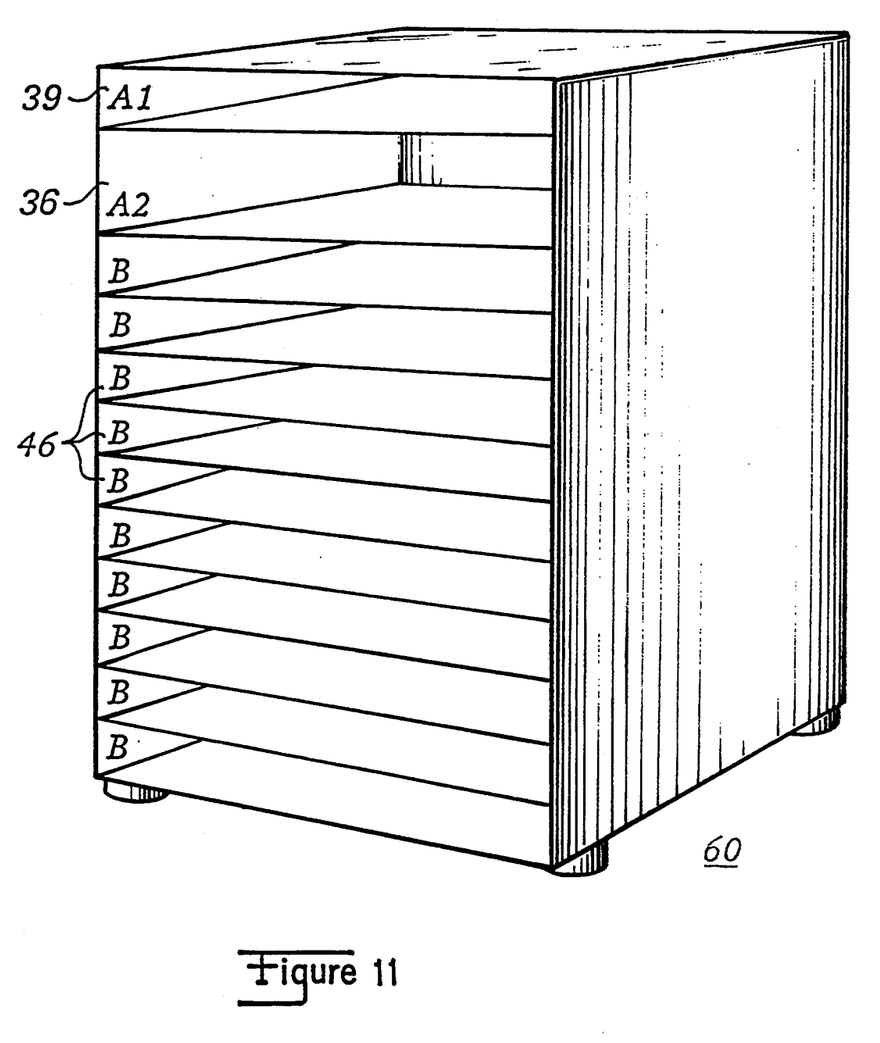
FIG. 11 is a perspective view of a storage-transfer rack for master sheets and carrier sheets before and after exposure.

For multiple master films 31 and prepared screen frames, a suitable storage transfer rack 60 of storage bins 36,39,46 may be configured as illustrated in the perspective view of FIG. 11. The upper bin 39 may be used to store a plurality of different master films 31 (on associated carrier sheets) prior to exposure, and a lower bin 36 may be used to store the master films 31 after each exposure, and the lower-most bins 46 may be used to Store prepared screen frames both before and after exposures. Thus, the entire storage-transfer rack 60 may be transported between various work stations at which carrier sheets and screen frames are separately prepared, and the work station at which the contact exposures are performed, as later described herein.

Figure 12A:
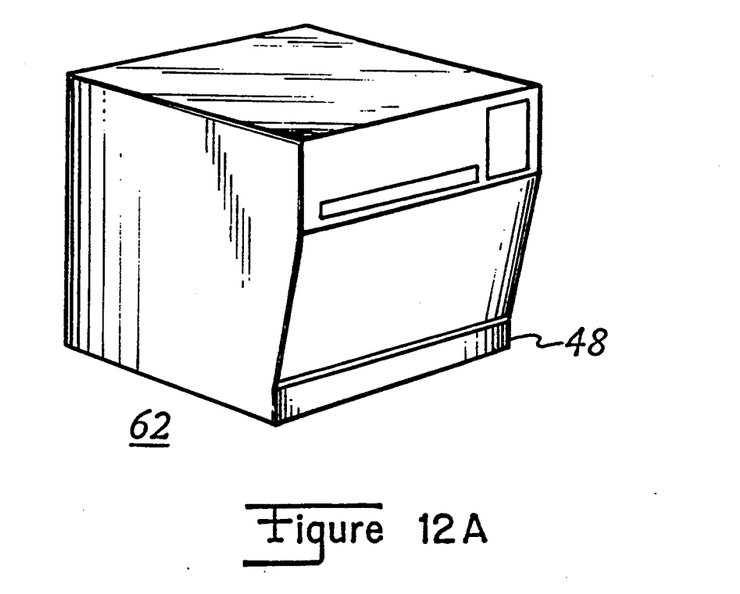
FIG. 12(a) and 12(b) are perspective views of a screen exposure unit in closed and open configurations, respectively, during exposure and during loading and unloading operations.
Figure 12B:
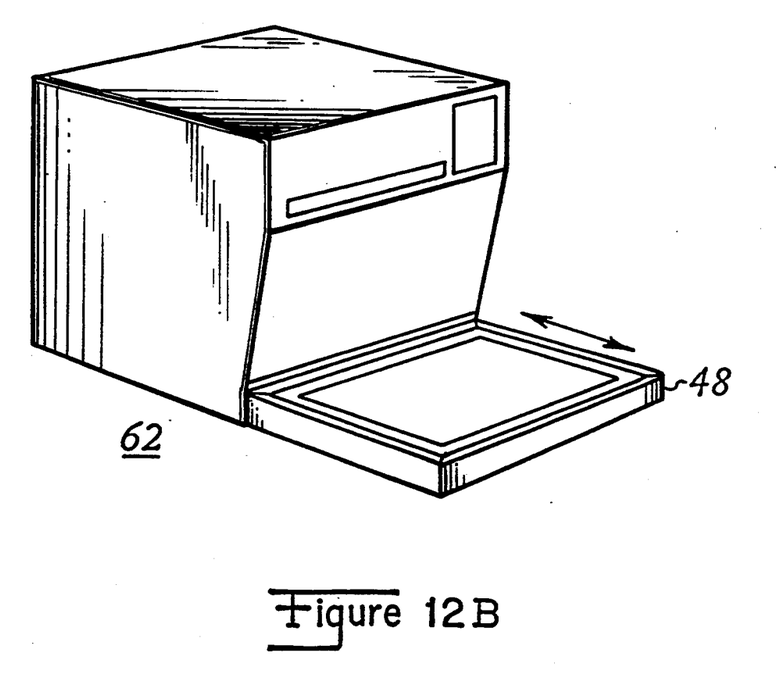
Figure 13A:
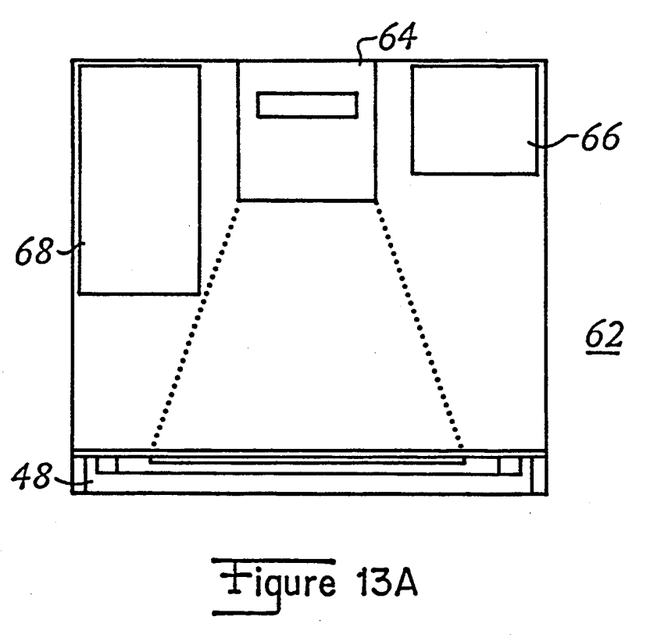
FIGS. 13(a) and 13(b) are, respectively, front and top skeletal views of the screen exposure unit according to the present invention.
Figure 13B:
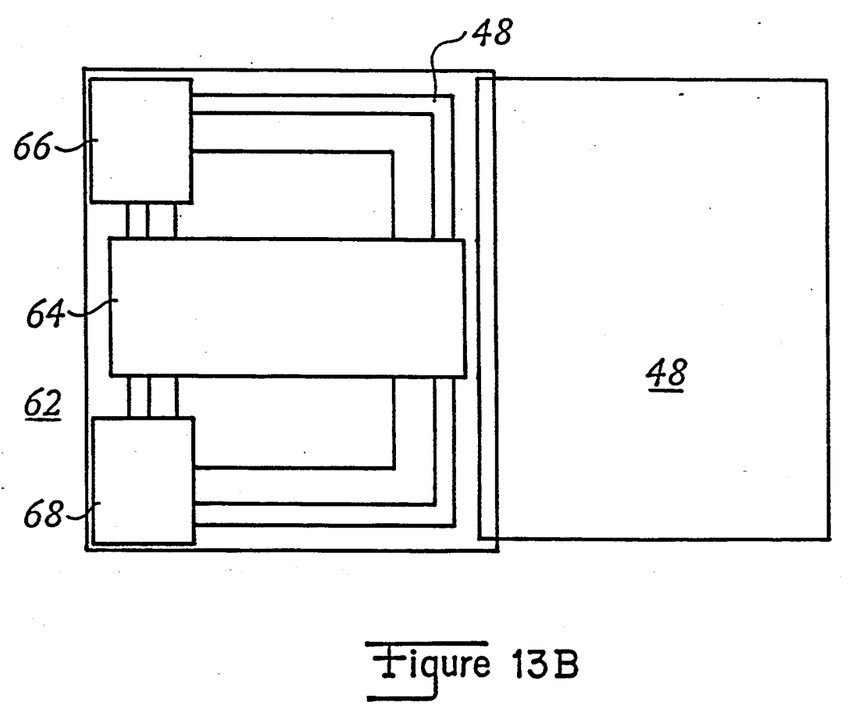

As illustrated in the perspective views of FIGS. 12(a) and 12(b)), there is shown a screen exposure unit 62 which includes a vacuum contact plate 48 that is translationally mounted in the lower section of the housing 62 for convenient loading and unloading of screen frames and master films before and after exposures within the housing. Specifically, as illustrated in the skeletal views of FIGS. 13(a) and 13(b), there are shown front and top views, respectively, of the components that are disposed within the housing 62. A source 64 of illumination (for example, ultraviolet light) is disposed within the housing 62 above the vacuum contact plate 48 to illuminate the photosensitive coating 42 on screen 40 through the master film 31 on the underside of a carrier sheet 33, thereby to transfer the master image to the prepared screen. A vacuum pump 66 may also be disposed within the housing 62 and be connected to the vacuum port 56 in the vacuum contact plate 48 for evacuating air to urge the carrier sheet 33 against the photosensitive coating 42 on the screen 40 prior to and during exposure of the master film 31 and screen 40 to the source of illumination 64. The vacuum contact plate 48 may thus be mounted on tracks for convenient movement thereof into and out of illumination position within the housing 62 from the loading and unloading position outside the housing 62. Vacuum may be drawn rapidly after loading because of the small volume of air involved, and because of the porous screen 40 that facilities rapid evacuation of air from beneath the carrier sheet 33. A power supply 62 may also be mounted in the housing 68 to power a halide-type ultraviolet light source 64. A control unit of conventional design may include a light integration device to accurately measure light exposure by controlling the light intensity and duration through .connection to the power supply (not shown). Such a control unit may also control the vacuum pump 66, and may be deactivated through safety interlocks on the sliding vacuum contact plate 48 and all access doors. Such control unit may also optionally control the movement of the vacuum contact plate 48 between the load/unload position and the exposure position. The operating sequence preferably includes loading a prepared screen and master film into the vacuum contact plate 48, evacuating air from beneath the carrier sheet 33, retracting the: vacuum contact plate 48 into the housing 62, exposing the photosensitive coating 42 on the prepared screen 40 to the light source 64 through the master film 31 on the underside of the carrier sheet 33, and then releasing vacuum and deploying the vacuum contact plate 48 to the loading/unloading outside the housing 62. A series of such exposure operations may be facilitated at a rapid rate with the aid of the storage-transfer rack 60 used in the manner as previously described, and without the need for a conventional glass platen overlaying the photographic materials as the reference against which the photographic materials are retained in contact registration during exposure. After each screen frame is exposed, the photosensitive coating 42 may be further processed in conventional manner to 'fix' the image optically transferred thereto from the master film 31, for example, to provide an image of porous and non-porous segments of the screen 40 for use in conventional silk screening operations.

Figure 14:
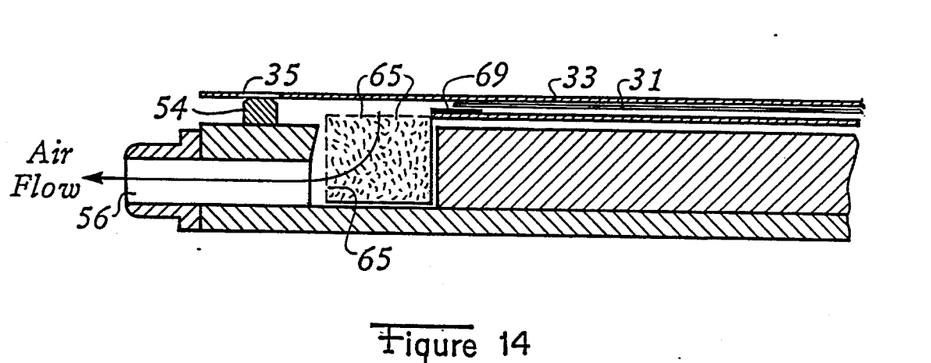
FIGS. 14 and 15 are sectional views of alternative embodiments of a porous frame for supporting printing plates thereon relative to registration marks or pins.

The exposure unit 62 may also be utilized to expose film masters from the original art film, or to expose proofing materials such as the DuPont Cromacheck ® (registered trademark E. I. DuPont), or printing plates 67, or other photosensitive material to be exposed. For this application, an open face frame similar to the screen frame 38 may be inserted into the open channel between the outer frame 50 and the outer perimeter of the central screen support 52 of the vacuum contact plate 48. This open face frame is similar in size and construction to the screen frame 38 but it is not fitted with a screen 40. Instead, as illustrated in FIG. 14, the open face frame has holes 65 on its outer perimeter and on one flat side that is used in an upward position. Vacuum can extract air from between the materials to be exposed 33, 67, with the airflow passing through the holes 65 in the open face frame to the vacuum port 56. In this application, it may be necessary to apply a roller or squeegee across materials of slick surface that may not be as conducive to air flow therebetween as the screens 40 are.

Figure 15:
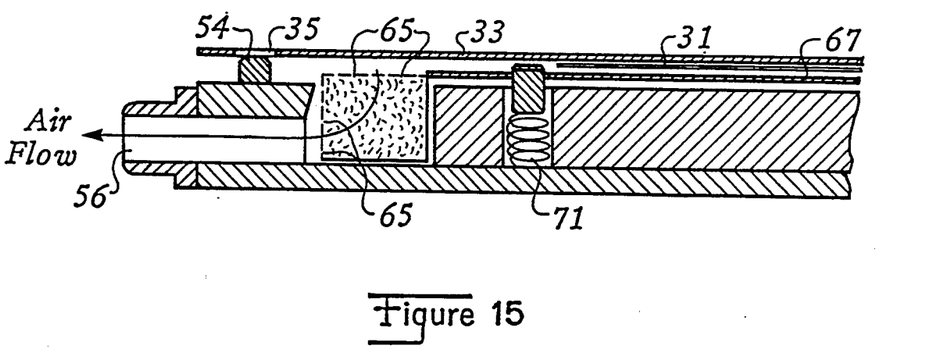
Figure 16:
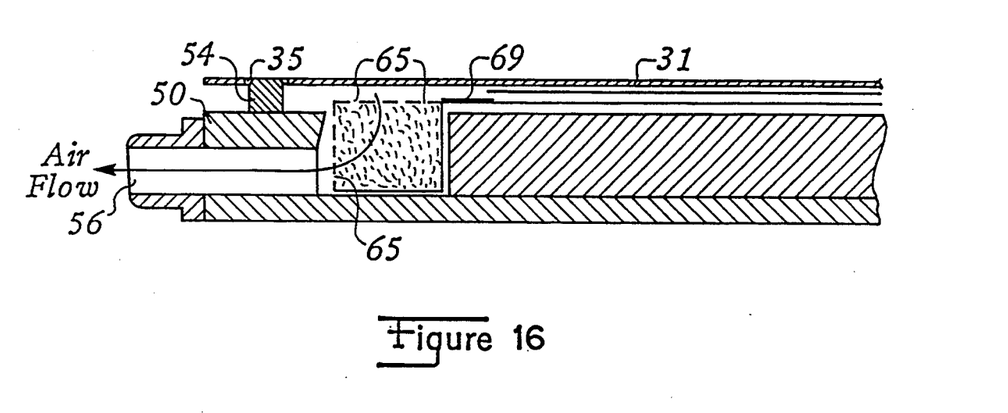
FIGS. 16 and 17 are sectional views of alternative embodiments of a porous frame for supporting printing plates thereon relative to registration marks or pins, wherein the flexible carrier sheet comprises the image-bearing original or master sheet.
Figure 17:
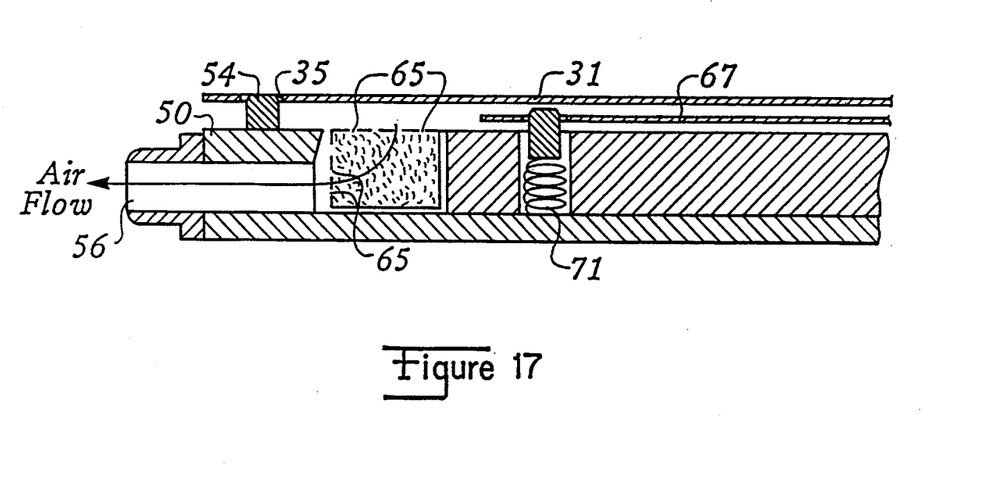

With the open face frame, the original films or master sheets 33 are placed in registration with the photosensitive sheet(s) in the same manner as for screen exposures, as illustrated in FIGS. 14 and 15. To place the master films or plates to be exposed in proper register, the position may be marked on the central screen support 52, or it may be designated by a tape 69 that is affixed to the central support 52 as a stop position, as shown in FIGS. 14 and 16. Alternatively, retractable register pins 71 may be installed in the central support 52, as illustrated in FIGS. 15 and 17 for such an application. These register pins are retracted for the exposure of screens beneath the cover sheet 33 and master film 31. Of course, the master film 31 may also serve as the flexible cover sheet for forming a vacuum seal about the perimeter thereof with the outer frame 50 of the vacuum contact plate 48, as illustrated in FIGS. 16 and 17.

Therefore, the apparatus and method of the present invention greatly facilitate the rapid contact exposure of prepared screen frames and master films using lightweight components that obviate the need for conventional exposure platens and vacuum blankets with associated bulkiness, delays in exposure set ups, and associated expenses.

What is claimed is:

1. Apparatus for holding a master image-bearing sheet in registration with a layer of photosensitive material, the apparatus comprising:

a contact plate including an elevated central region and including a recessed perimeter about the central region for receiving a frame therein, said contact plate including a border disposed to surround a frame received within said recessed perimeter, and including a vacuum port communicating with the recessed perimeter for evacuating air therefrom;

a frame for positioning within said recessed perimeter and disposed about the layer of photosensitive material to provide an intermediate border thereabout to facilitate evacuation of air from about the layer; and said border having dimensions for receiving outer boundaries of a master image-bearing sheet to form a seal therewith in response to air being evacuated from said recessed perimeter of said contact plate to retain the master image-bearing sheet in contact registration with the layer of photosensitive material.

2. Apparatus according to claim 1 wherein said layer includes a screen including a region of photosensitive material thereon attached near outer boundaries thereof to the frame.

3. Apparatus according to claim 1 wherein said image-bearing sheet includes at least a pair of registration holes near the perimeter for receiving alignment pins therein; and said contact plate includes alignment pins disposed about the border thereof to receive thereon the registration holes of an image-bearing sheet disposed over said central region and border of the contact plate.

4. Apparatus according to claim 1 comprising:

a housing for a source of illumination and including said contact plate mounted in a lower region thereof for articulated motion between an exposure position within the housing and a loading/unloading position outside the housing.

5. Apparatus according to claim 1 comprising:

vacuum means coupled to the vacuum port of the contact plate for selectively evacuating air from within the central region of the contact plate and the recessed perimeter thereabout beneath an image-bearing master sheet overlaying said border.

6. A method for holding a master image-bearing sheet in registration with a screen having a region thereon of photosensitive material, the method comprising the steps of:

attaching a supporting frame to a screen at an orientation thereon which is spaced away from the photosensitive material to provide an intermediate border about said region and within the frame that is substantially porous to passage of air therethrough;

supporting the frame and attached screen within a central region having surface dimensions at least as large as the dimensions within the frame;

receiving the frame within a recess about the central region for positioning the frame in selected registration within the recess;

positioning a master sheet on the screen to orient a master image at least within said region of photosensitive material and to form an air seal between the outer perimeter of the master sheet and a border about the recess; and evacuating air through the screen from the region beneath the master sheet within the central region and recess to retain the master sheet and screen in contact registration.

7. The method according to claim 6 wherein an image-bearing sheet includes at least a pair of registration holes near the perimeter thereof for receiving alignment pins therein, and comprising the step of:

positioning the registration holes of an image-bearing sheet about alignment pins on the contact plate to receive an image-bearing sheet disposed over said central region and border of the contact plate for forming a seal therewith.

8. The method according to claim 6 comprising the steps of:

mounting the contact plate for movement between operating positions relative to a source of illumination for articulated motion between an exposure position proximate the source and a loading/unloading position remote from the source.

* * * * *